May 20, 1947. T. ULRICH 2,420,728
SEAT STABILIZER
Filed Dec. 3, 1941
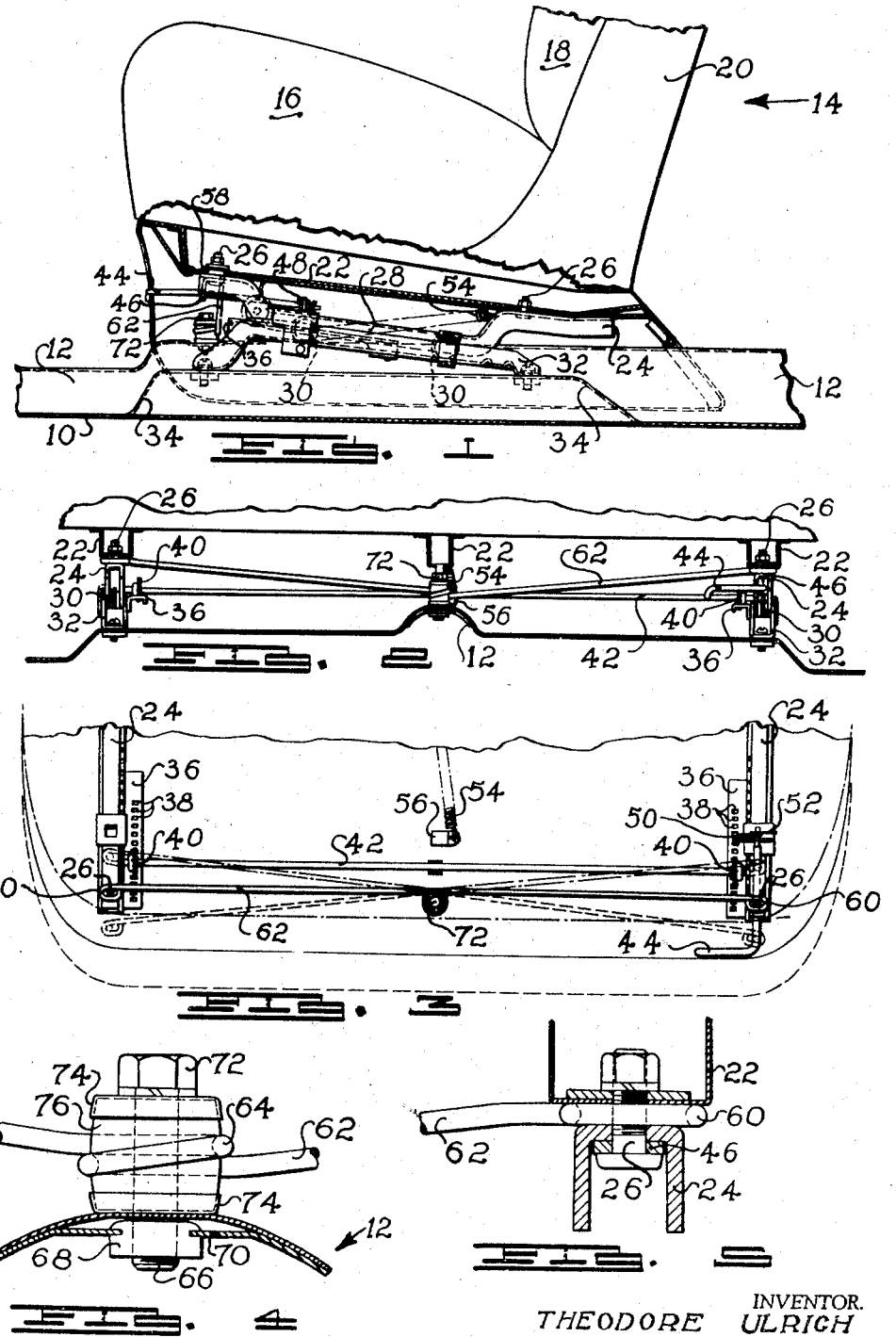
INVENTOR.
THEODORE ULRICH
BY Carl J. Barbee
HIS ATTORNEY Patented May 20, 1947

2,420,728

UNITED STATES PATENT OFFICE 2,420,728

SEAT STABILIZER

Theodore Ulrich, Milwaukee, Wis., assignor to Nash-Kelvinator Corporation, Kenosha, Wis., a corporation of Maryland Application December 3, 1941, Serial No. 421,409

8 Claims. (Cl. 155—14)

This invention relates to seats and more particularly to seats for vehicles of the kind which are adapted for adjustment forwardly and rearwardly of the vehicle in order to place a driver or operator in a more comfortable or advantageous position for the manipulation or driving of the vehicle.

In the automobile industry, it is common practice today to provide the driver's seat of an automobile with a fore and aft adjustment so as to permit persons of all statures, whether tall or short, to assume a comfortable position with respect to the clutch, brake and accelerator pedals. Adjusting mechanism of this type usually takes the form of a plurality of rollers upon each side of the seat which roll upon a track provided either in the seat stringer or in a seat support. Means are also provided for locking the seat in an adjusted position.

A common failing of such types of seats is that the adjusting mechanism must be constructed with rather wide tolerances in order that its assembly will not become too difficult. Consequently, adjustable seats are apt to be somewhat noisy and subject to a great deal of side sway or lateral vibration because of their looseness from the moment of their original assembly. It is also necessary that such wide tolerances be built into the seat because of the location of the adjusting mechanism close to the floor of the vehicle where considerable dust and dirt will seep into the mechanism and interfere with its operation within a short time if such tolerances were not provided.

When the weight of one or more passengers is imposed upon a seat, the loosenesses in the adjusting mechanism become even more apparent and in extreme cases are apt to result in discomfort to the passengers as their own weight aggravates the vibration and side sway.

In order to overcome these disadvantages, it is an object of this invention to provide a stabilizer which will prevent lateral vibrations of the driver's seat of a vehicle by rigidly securing the seat against such vibrations.

A further object of the invention is to stabilize a seat of a vehicle in such a way as to permit its adjustment fore and aft of the vehicle to accommodate the seat to drivers of different sizes and statures.

Further objects will appear hereinafter as the description proceeds and will be pointed out more particularly in connection with the appended claims.

In the drawings, of which there is one sheet:

Figure 1 is a side elevational view partly in section of a seat showing the invention applied thereto;

Figure 2 is a transverse sectional view through the seat shown in Figure 1 taken upon a plane through the stabilizer mechanism;

Figure 3 is a plan view of the seat adjusting mechanism taken approximately upon planes representing the planes of attachment of the seat adjusting mechanism to the underside of the seat itself;

Figure 4 is a detail view showing the means of connecting the stabilizer to the floor; and, Figure 5 is a detail sectional view showing the means of attachment of the stabilizer to the seat.

Referring more particularly to the drawings, in which similar reference characters are employed to designate similar parts, the invention will be seen to reside in an automobile of which the floor or underbody is designated 10. Underbody 10 is provided with the usual drive shaft tunnel 12 which extends centrally beneath a seat generally indicated at 14 and comprising a seat cushion 16 and a back cushion 18 supported on a frame 20.

The underside of the frame 20 is secured to a plurality of seat stringers 22 which extend one on each side and one in the middle of the seat and may be secured to the frame by any suitable means, such as by welding. The two side seat stringers 22 may be secured to frame elements 24 by means of bolts 26. Frame elements 24 are provided with drop centers 28 which are adapted to journal rollers 30 rotatably thereon for rolling upon seat adjuster tracks 32 supported upon their ends from the seat riser portion 34 of the underbody 10.

The seat adjuster tracks 32 may have racks 36 secured thereto, such racks being provided with a series of perforations 38 adapted to cooperate with pinions 40 fast to opposite ends of a cross shaft 42. The purpose of the cross shaft, pinions and racks is simply to maintain the two sides of the seat in similar positions of adjustment, the cross shaft 42 being journaled in the frame 24.

A hand lever 44 is journaled within the frame 24 upon the left side of the vehicle in ears 46 and 48 and accessible to the vehicle operator, and is provided with a detent 50 engageable in the apertures 38 to lock the seat in adjusted position. A torsion spring 52 urges the detent 50 to its locking position.

A coil spring 54 may be anchored at one end to the underside of the seat and at its other end to a bracket 56 secured to the floor 10 of the vehicle, spring 54 serving to assist in adjusting the seat forwardly.

As thus far described, the seat and adjusting mechanism are more or less conventional and it is to the stabilization of a seat of such conventional form that the subject matter of this invention is directed.

The seat stringers 22 may be provided adjacent their forward points of connection to the frames 24 with a recessed portion 58 and within these recessed portions there may be received the looped ends 60 of a stabilizer wire 62 of relatively heavy cross section. The bolts 26 which secure the frames 24 to the seat stringers 22 may be employed for clamping the loops 60 of stabilizer wire 62 between the stringers 22 and frames 24. Intermediate its ends, the stabilizer wire 62 may take one or more turns at 64 so as to form a bight around a mast or post 66. The mast or post 66 may take the form of a screw which is threaded into a clinch nut 68 suitably secured in one of the members 70 forming the underside of the floor 10. Embracing the screw 66 beneath the head 72 thereof and upon the upper surface of the drive shaft tunnel 12, cup shaped washers 74 may be provided for receiving a cylindrical rubber biscuit 76 which is compressed between the washers 74 by means of the screw 66 and clinch nut 68. It will be noted that the bight 64 of the stabilizer wire 62 is imbedded slightly in the rubber biscuit 76 due to the fact that it is installed with a small amount of initial tension.

The showing in full lines in Figure 3 and in Figure 4 of the drawings is of the stabilizer with the seat at its midposition, in which position the distance between the post 66 and the edges of the seat at the bolts 26 is at a minimum. When the seat is adjusted forwardly or rearwardly of this midposition (as indicated by the broken lines of Figure 3), the distance between the post 66 and the bolts 26 will become greater and this increase is accommodated by deformation of the biscuit 76, the bight 64 of the stabilizer wire 62 simply imbedding itself more deeply in the rubber. Some additional tension upon the stabilizer wire 62 will be caused by the adjustment of the seat fore and aft of its midposition but this additional tension only serves to increase the stabilizing effect of the wire 62.

It will be recognized that the connections of the stabilizer wire 62 to the seat and to the floor may be reversed by locating the rubber encased post upon the central stringer 22 of the seat and securing the ends 60 of the wire 62 to the floor. A further modification would be to use two wires, each of which extends transversely and diagonally downward from a connection to the seat to a connection to the floor, a suitable resilient connection being provided for accommodating the lengthening and shortening of the distance between the seat and the floor connections when an adjustment is made forwardly or rearwardly of the midposition of the seat.

Numerous modifications will at once occur to those skilled in the art and it is contemplated that any modifications falling within the scope of the appended claims are expressly reserved even though the invention has been described in considerable detail in the modification disclosed.

What is claimed and is desired to be secured by Letters Patent is:

1. In a vehicle, a floor, a seat, means for adjusting the seat lengthwise of the vehicle relative to the floor, a flexible stay rigidly secured to said seat at each side thereof, an element rigid with said floor, a loop in said stay intermediate the ends thereof and wound around said element, and a cushion member between said element and loop in which said loop is variably imbedded as the seat is adjusted longitudinally of the vehicle.

2. In a vehicle, a floor, a seat, means for adjusting said seat lengthwise of the vehicle relative to the floor, a flexible stay comprising a tension element rigidly secured at its ends to the seat adjacent each side thereof, a stud projecting from the floor, a cushion member around said stud, said tension element being wound around said stud intermediate its ends and variably imbedded in said cushion member as the distance between said stud and the ends of said tension element is increased upon adjustment of the seat longitudinally of the vehicle.

3. In a vehicle, a seat, a floor, means for adjusting said seat relative to said floor longitudinally of the vehicle, a post secured to said floor beneath said seat, a stabilizer comprising a wire rigidly attached at each end to said seat and having its intermediate portion wound around said post, and a resilient biscuit between said wire and post and in which said wire is variably imbedded as the distances between the ends of said wire and said post are increased by the adjustment of said seat longitudinally over the floor.

4. In a vehicle, a seat, a floor, means for adjusting said seat relative to said floor longitudinally of the vehicle, a cushion element secured to said floor beneath said seat, and a stabilizer comprising a wire rigidly attached to said seat at each end of said wire adjacent the side edges of said seat and having its intermediate portion wound around said cushion element.

5. In a vehicle, a floor, a seat, means supporting said seat transversely of the vehicle and above said floor, means for adjusting the position of said seat longitudinally of the vehicle, and a stabilizer for preventing movement of the seat in all directions except the direction of adjustment, said stabilizer including a tension element extending transversely of the seat and having its ends secured to said seat and a rubber-covered post projecting upwardly from said floor, said rubber being in compressed condition, said tension element being wound around said post intermediate its ends.

6. In a vehicle, a pair of elements to be stabilized including a seat and a floor, means supporting said seat transversely of the vehicle above the floor, means for adjusting the position of said seat longitudinally of the vehicle, and a stabilizer for preventing movement of the seat in all directions except the direction of adjustment, said stabilizer comprising a flexible tension member extending transversely of the vehicle and rigidly secured at its ends to one of said pair of elements and a rubber-covered post secured to the other of said pair of elements, said tension member being wound around said post intermediate its ends and variably imbedded in the rubber of said post as the distances between its ends and said post are increased by adjustment of said seat longitudinally of the vehicle.

7. In a vehicle, a seat, a floor, means for adjusting said seat longitudinally of the vehicle fore and aft of a mid-position relative to said floor, a stabilizer comprising a single flexible stay extending transversely of the vehicle and normal to the direction of adjustment of said seat when the seat is at mid-position, and means connecting said stay to the lateral sides of said seat and to said floor, respectively, at least one of said connecting means being resilient in character to impose a tensile stress upon said stay in all positions of adjustment of said seat.

8. In a vehicle, a seat, a floor, means for adjusting said seat relative to said floor in a direction longitudinally of the vehicle, a rigid abutment on said floor centrally of said seat, flexible brace means extending transversely of said vehicle from said abutment in an upward and outward direction to a point of anchorage on a lateral portion of said seat, and resilient means between said abutment and said brace means to provide tension on said brace means in all positions of adjustment of said seat.

THEODORE ULRICH.

REFERENCES CITED

The following references are of record in the file of this patent:

UNITED STATES PATENTS

| Number | Name | Date |
| --- | --- | --- |
| 2,261,728 | Lawler | Nov. 4, 1941 |
| 2,263,834 | Andersen | Nov. 25, 1941 |
| 1,962,789 | Simpson et al. | June 12, 1934 |
| 2,256,009 | Atwood | Sept. 16, 1941 |
| 249,309 | Comstock et al. | Nov. 8, 1881 |
| 400,640 | Corey | Apr. 2, 1889 |

FOREIGN PATENTS

| Number | Country | Date |
| --- | --- | --- |
| 454,639 | Great Britain | Oct. 5, 1936 |
| 438,380 | Great Britain | Nov. 15, 1935 |